United States Patent
Yang et al.

(10) Patent No.: US 8,486,352 B2
(45) Date of Patent: Jul. 16, 2013

(54) MICRO-VALVE STRUCTURE INCLUDING POLYMER ACTUATOR AND LAB-ON-A-CHIP MODULE

(75) Inventors: Kwang Suk Yang, Daejeon (KR); Ji Sun Yun, Daejeon (KR); Nakjin Choi, Daejeon (KR); Hyung-Kun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 55 days.

(21) Appl. No.: 13/100,910

(22) Filed: May 4, 2011

(65) Prior Publication Data

US 2011/0272610 A1 Nov. 10, 2011

(30) Foreign Application Priority Data

May 4, 2010 (KR) .................. 10-2010-0042060
Dec. 17, 2010 (KR) .................. 10-2010-0129857

(51) Int. Cl.
*B01L 99/00* (2010.01)

(52) U.S. Cl.
USPC ............. 422/537; 422/50; 422/500; 422/501; 422/502; 422/503; 422/505; 436/180

(58) Field of Classification Search
USPC 422/537, 50, 500–503, 505; 417/53; 436/180
See application file for complete search history.

(56) References Cited

U.S. PATENT DOCUMENTS

| | | | |
|---|---|---|---|
| 6,505,912 B2 * | 1/2003 | Silverbrook et al. | 347/54 |
| 6,960,864 B2 | 11/2005 | Urano et al. | |
| 7,052,594 B2 | 5/2006 | Pelrine et al. | |
| 7,090,471 B2 * | 8/2006 | Xie et al. | 417/53 |

FOREIGN PATENT DOCUMENTS

| | | |
|---|---|---|
| KR | 1020080041975 A | 5/2008 |
| KR | 1020090004954 A | 1/2009 |
| KR | 1020090011351 A | 2/2009 |
| KR | 1020090047096 A | 5/2009 |
| WO | WO 01/06579 A2 | 1/2001 |

OTHER PUBLICATIONS

Thanh Tung Nguyen et al., "Design, fabrication, and experimental characterization of a flap valve IPMC micropump with a flexibly supported diaphragm", Sensors and Actuators A, 2008, pp. 640-648, vol. 141, Elsevier B.V.
Schlaak, Helmut F. et al., "Novel Multilayer Electrostatic Solid-State Actuators with Elastic Dielectric", Smart Structures and Materials 2005: Electroactive Polymer Actuators and Devices, 2005, pp. 121-133.
Kornbluh, Roy et al., "Electroactive polymers: An emerging technology for MEMS", MEMS/MOEMS Components and Their Applications, 2004. pp. 13-27.
Shahinpoor, Mohsen et al., "Ionic polymer—Metal composites: IV. Industrial and medical applications", Smart Materials and Structures, 2005, pp. 197-214, vol. 14.

* cited by examiner

*Primary Examiner* — Jyoti Nagpaul

(57) ABSTRACT

Provided are a micro-valve structure and a lab-on-a-chip module that include a polymer actuator. The micro-valve structure may include a flexible structure disposed on a substrate, and the polymer actuator inserted into the flexible structure. At this time, the flexible structure has a valve portion defining a microchannel and the polymer actuator is separated from the microchannel by the flexible structure. In addition, the polymer actuator is formed to change a width of the microchannel by controlling a displacement of the valve portion.

18 Claims, 13 Drawing Sheets

MICRO-VALVE STRUCTURE INCLUDING POLYMER ACTUATOR AND LAB-ON-A-CHIP MODULE

CROSS-REFERENCE TO RELATED APPLICATIONS

This U.S. non-provisional patent application claims priority under 35 U.S.C. §119 of Korean Patent Applications Nos. 10-2010-0042060, filed on May 4, 2010, and 10-2010-0129857, filed on Dec. 17, 2010, the entire contents of which are hereby incorporated by reference.

BACKGROUND

The present invention disclosed herein relates to a microchannel control technology, and more particularly, to a microvalve structure and a lab-on-a-chip module which include a polymer actuator.

Recently, developments and applications of a microfluidic control technology, which controls the flow rate or the direction of a microfluid, continue to accelerate along with the advances in biosensor and semiconductor technologies. A trace amount of a component included in a biological fluid such as blood may be quantitatively or qualitatively detected by the microfluidic control technology. Therefore, the microfluidic control technology has become a core technology in the technical field of a biochip or a lab-on-a-chip (LOC).

A patterning technology enabling to form microchannels in desired shapes and a switching technology enabling to control the opening and closing of the microchannels have to be secured in order to control the microfluid. The patterning technology of the microchannel has become available due to the advances in a semiconductor manufacturing technology or a microelectromechanical system (MEMS) technology. The switching technology of the microchannel may be achieved through a microactuator using a piezoelectric device. Although the microactuator using the piezoelectric device provides high-reliability as well as being appropriate for mass production, it is difficult to be used in a point-of-care testing (POCT) device or a portable device due to its large power consumption and limitations in miniaturization.

SUMMARY

The present invention provides a micro-valve structure capable of providing small power consumption, small volume and reinforced durability.

The present invention also provides a lab-on-a-chip including a micro-valve structure capable of providing small power consumption, small volume and reinforced durability.

Embodiments of the present invention provide a micro-valve structure, in which the opening and closing of the valve are directly controlled by a polymer actuator. The micro-valve structure may include a substrate; a flexible structure disposed on the substrate; and a polymer actuator inserted into the flexible structure. At this time, the flexible structure has a valve portion defining a microchannel and the polymer actuator may be separated from the microchannel by the flexible structure. In addition, the polymer actuator may be formed to change a width of the microchannel by mechanically and directly controlling a displacement of the valve portion.

In some embodiments, the polymer actuator may include a pair of electrodes and an ionic polymer metal composite disposed therebetween. The ionic polymer metal composite may be one of sulfonated tetrafluoroethylene based fluoropolymer-copolymers.

In other embodiments, the microchannel may include first and second channels spaced apart from each other, the valve portion of the flexible structure is disposed between the first and second channels, and the polymer actuator may have a portion inserted into the valve portion. Also, the polymer actuator may have a width greater than a sum of widths of the first and second channels and the valve portion, and may have a parallelepiped shape having rectangular upper and lower surfaces.

In still other embodiments, the microchannel may have an inlet where a fluid is supplied from outside and has an outlet where the fluid is discharged. Also, the substrate has a recessed region used as the microchannel and the valve portion of the flexible structure may be inserted into the recessed region.

In even other embodiments, a widest surface of the polymer actuator may be disposed substantially parallel to an upper surface of the substrate.

In yet other embodiments, the widest surface of the polymer actuator may be disposed substantially perpendicular to the upper surface of the substrate.

In further embodiments of the present invention, a micro-valve structure may include a substrate; a flexible structure including a valve portion between first and second channels spaced apart from each other and disposed on the substrate; and a polymer actuator inserted into the flexible structure to control a displacement of the valve portion.

In still further embodiments, the polymer actuator may be spaced apart from the first and second channels by the flexible structure. The polymer actuator may include a pair of electrodes and an ionic polymer metal composite disposed therebetween. At this time, the polymer actuator is surrounded by the flexible structure such that the electrodes of the polymer actuator may not be exposed by an external atmosphere or the first and second channels. The ionic polymer metal composite may be one of sulfonated tetrafluoroethylene based fluoropolymer-copolymers.

In even further embodiments of the present invention, a lab-on-a-chip module may include a flexible structure; a plurality of polymer actuators inserted into the flexible structure; and a controller independently controlling the polymer actuators, respectively. At this time, the flexible structure may include a first channel, a plurality of second channels, and a plurality of valve portions spatially separating the second channels from the first channel, and the polymer actuators may be formed to control displacements of the valve portions, respectively.

In yet further embodiments, the controller may be formed to actuate at least two of the polymer actuators at different times from each other with a predetermined time interval.

In much further embodiments, the first channel is formed to pass a fluid including biomolecules, and reactants reacting with the biomolecules may be formed in the second channels, respectively. The reactants formed in the second channels may be the same and all the polymer actuators may be actuated at different times from each other. In addition, at least one reaction detector may be further disposed on the second channels to monitor a reaction between the fluid and the reactant.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE EMBODIMENTS

Figure 1:
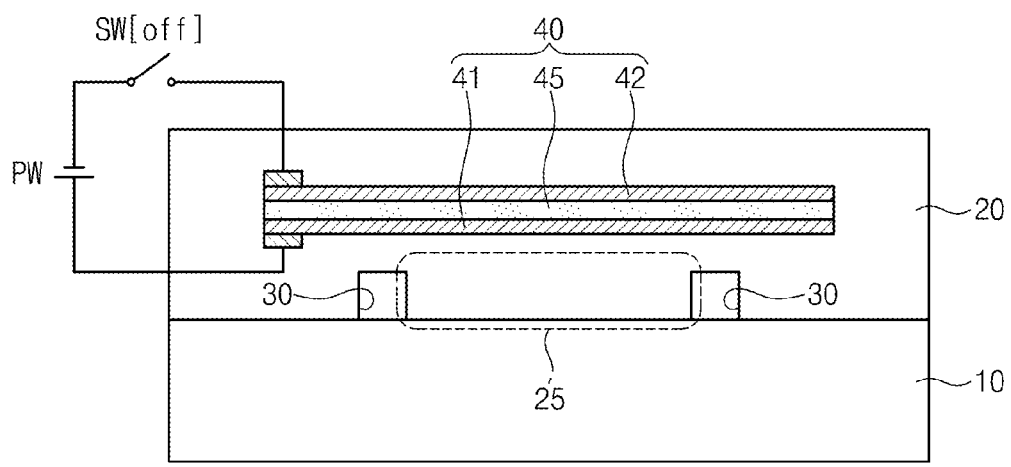
FIGS. 1 and 2 are drawings exemplarily illustrating a micro-valve structure and an operating method thereof according to an embodiment of the present invention.

The above objects, other objects, features and advantages of the present invention will be better understood from the following description of preferred embodiments taken in conjunction with the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the specification, it will be understood that when a layer (or film) is referred to as being 'on' another layer or substrate, it can be directly on the other layer or substrate, or intervening layers may also be present. In the drawings, the dimensions of layers and regions are exaggerated for clarity of illustration. Also, though terms like a first, a second, and a third are used to describe various regions and layers in various embodiments of the present invention, the regions and the layers are not limited to these terms. These terms are used only to discriminate one region or layer from another region or layer. Therefore, a layer referred to as a first layer in one embodiment can be referred to as a second layer in another embodiment. An embodiment described and exemplified herein includes a complementary embodiment thereof.

Figure 2:
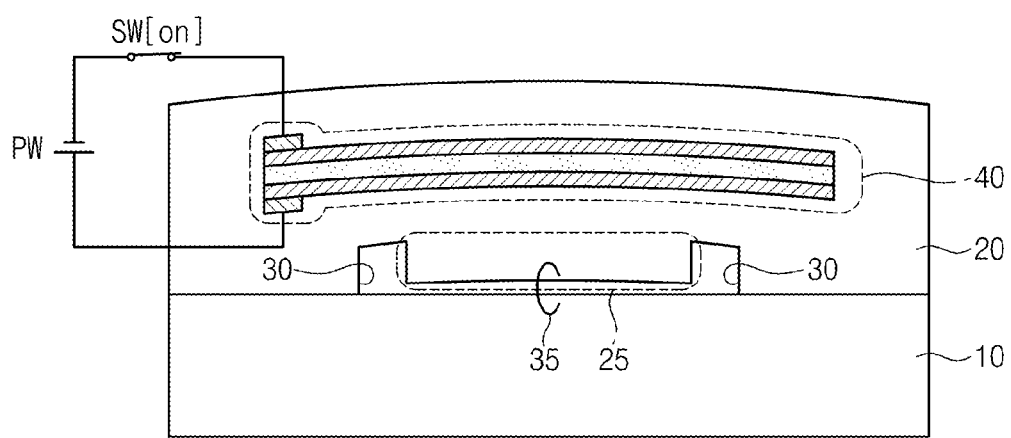

FIGS. 1 and 2 are drawings exemplarily illustrating a micro-valve structure and an operating method thereof according to an embodiment of the present invention.

Referring to FIGS. 1 and 2, a flexible structure 20 is disposed on a substrate 10, and a polymer actuator 40 is inserted into the flexible structure 20.

Figure 5:
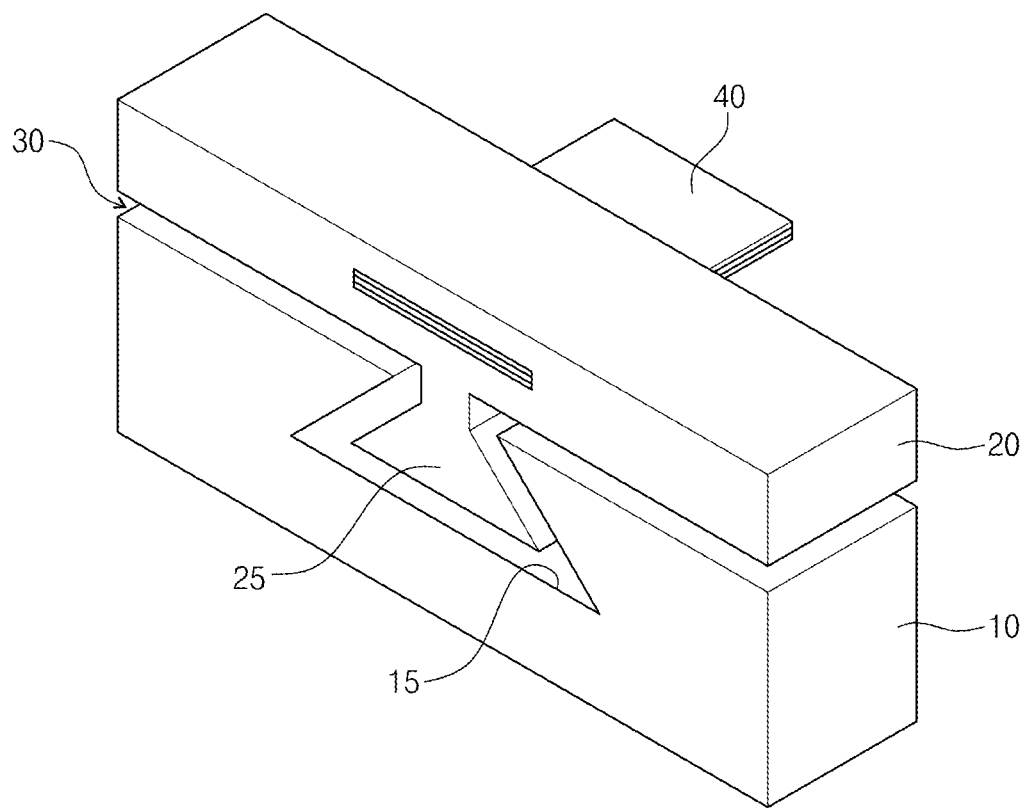
FIGS. 5 through 8 are perspective views exemplarily illustrating micro-valve structures and operating methods thereof according to modified embodiments of the present invention.
Figure 6:
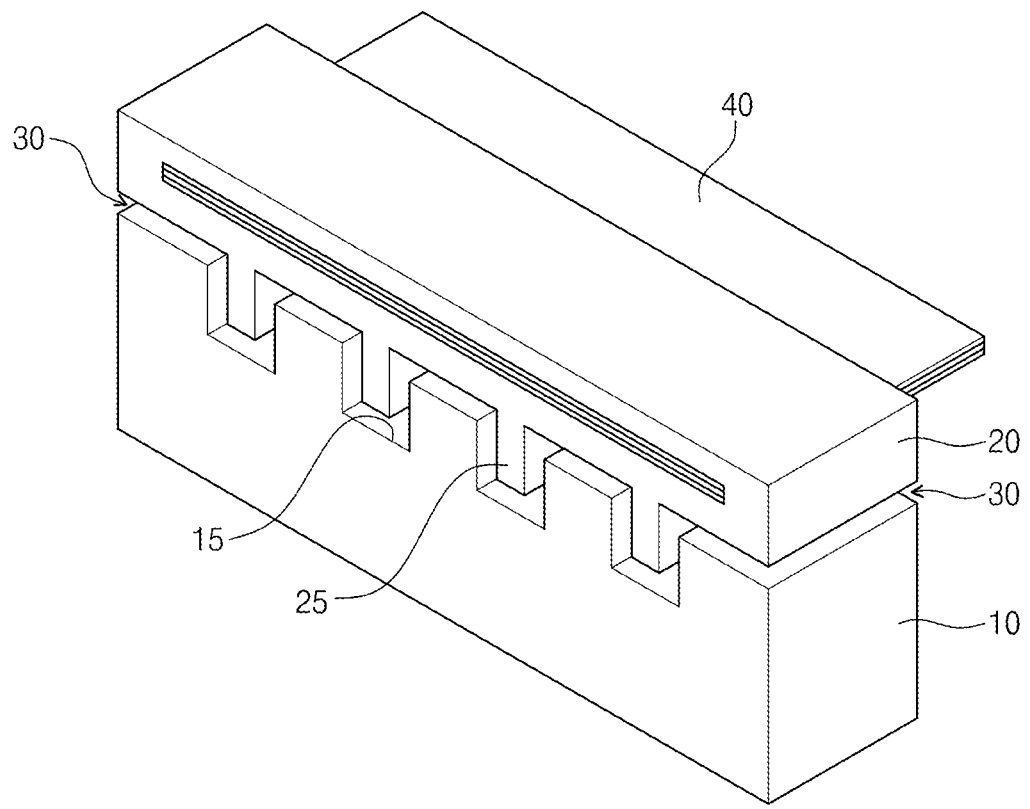
Figure 7:
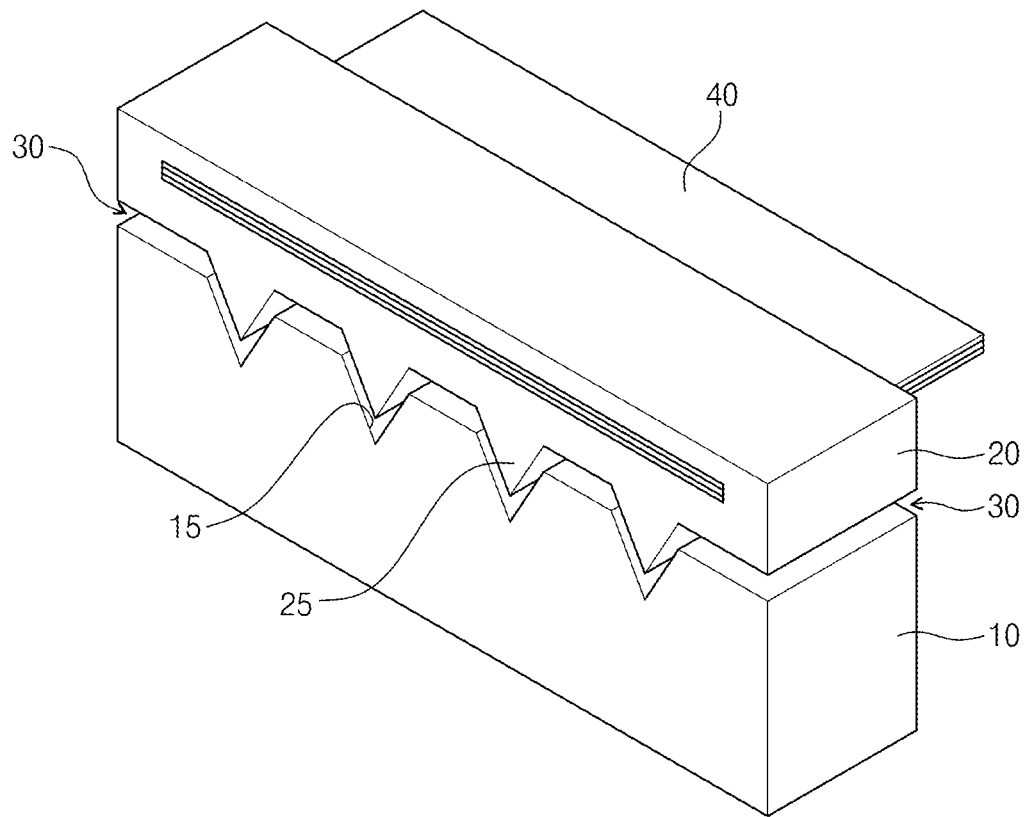

The substrate 10 and the flexible structure 20 may be disposed to define at least one channel 30. For example, the channel 30 may be formed between a bottom surface of the flexible structure 20 and an upper surface of the substrate 10. More particularly, as shown in FIG. 1, a sidewall of the channel 30 may be defined by the flexible structure 20. That is, the bottom surface of the flexible structure 20 may define the sidewall of the channel 30 by recessing upward. However, according to other embodiments, as shown in FIGS. 5 through 7, the upper surface of the substrate 10 may define the sidewall of the channel 30 by recessing downward.

The substrate 10 may be glass. However, the technical sprit of the present invention is not limited thereto. For example, the substrate 10 may be formed of at least one selected from materials which do not react with a fluid flowing in the channel 30 or with materials contained in the fluid.

The flexible structure 20 may be a polymer compound having elasticity. More particularly, the flexible structure 20 may be a material, which does not react with the fluid flowing in the channel 30 or with the materials contained in the fluid among the polymer compounds known as elastomer. For example, the flexible structure 20 may be formed of polydimethylsiloxane (PDMS).

The flexible structure 20 having the channel 30 may be formed using a soft-lithography technology. For example, the channel 30 may be formed on one surface of the flexible structure 20 by using one of micro contact printing (μCP), replica molding (REM), microtransfer molding (μTM), micromolding in capillaries (MIMIC) or solvent-assisted micromolding (SAMIM) technologies. The flexible structure 20 may be adhered onto the substrate 10 through a bonding process like an oxygen plasma treatment.

According to embodiments of the present invention, the flexible structure 20 may include a valve portion 25 disposed between the channels 30, and the sidewalls of the channel 30 may be defined by the valve portion 25. A bottom surface of the valve portion 25 may be substantially in contact with the upper surface of the substrate 10, but these surfaces may not be adhered to each other. Therefore, as illustrated in FIG. 2, the distance between the valve portion 25 and the substrate 10 may be controlled by the polymer actuator 40.

The polymer actuator 40 may include an electrically separated pair of electrodes 41 and 42 and an electroactive polymer 45 disposed between these electrodes 41 and 42. The electrodes 41 and 42 may include at least one metallic material. For example, the electrodes 41 and 42 may be platinum or gold, which is coated on two surfaces of the electroactive polymer 45 facing to each other. According to an embodiment, the electrodes 41 and 42 of the polymer actuator 40 may not be exposed by an external atmosphere or the channels 30. For this purpose, a thin protective layer (not shown) may be further formed on a surface of the polymer actuator 40. The protective layer may have a flexible characteristic.

The electroactive polymer 45 may be a material exhibiting a bending actuation under an applied voltage. For example, the electroactive polymer 45 may be an ionic polymer metal composite (IPMC). When the ionic polymer metal composite is used as the electroactive polymer 45, the potential difference between the electrodes 41 and 42 may generate the foregoing bending actuation and the accompanying displacements of the polymer actuator 40 and the valve portion 25 by means of ion migration and electrostatic repulsion generated in the ionic polymer metal composite. According to some embodiments, the ionic polymer metal composite may be a sulfonated tetrafluoroethylene based fluoropolymer-copolymer, but the technical sprit of the present invention is not limited thereto. According to modified embodiments, the ionic polymer metal composite may further include graphene oxide or graphene.

The polymer actuator 40 may be formed adjacent to the valve portion 25 in the flexible structure 20. In this case, as illustrated in FIG. 2, when the potential difference between the electrodes 41 and 42 is generated, the valve portion 25 may be spaced apart from the substrate 10 due to the bending actuation of the polymer actuator 40. As a result, a microchannel 35 connecting between the channels 30 may be formed between the valve portion 25 and the substrate 10.

According to some embodiments of the present invention, as illustrated in FIGS. 1 and 2, the valve portion 25 may be mechanically and directly connected to the polymer actuator 40. Accordingly, the valve portion 25 may be directly actuated by the polymer actuator 40. As a result, the mechanical displacement of the valve portion 25 may be directly controlled by the polymer actuator 40. The foregoing configuration of the present invention may provide far superior characteristics in terms of a reaction speed and an actuating force as compared to the modified embodiments in which the valve portion 25 is spaced apart from the polymer actuator 40. According to the foregoing embodiments, the polymer actuator 40 may be formed to have a width greater than the sum of widths of the pair of the channels 30 and the valve portion 25.

Figure 3:
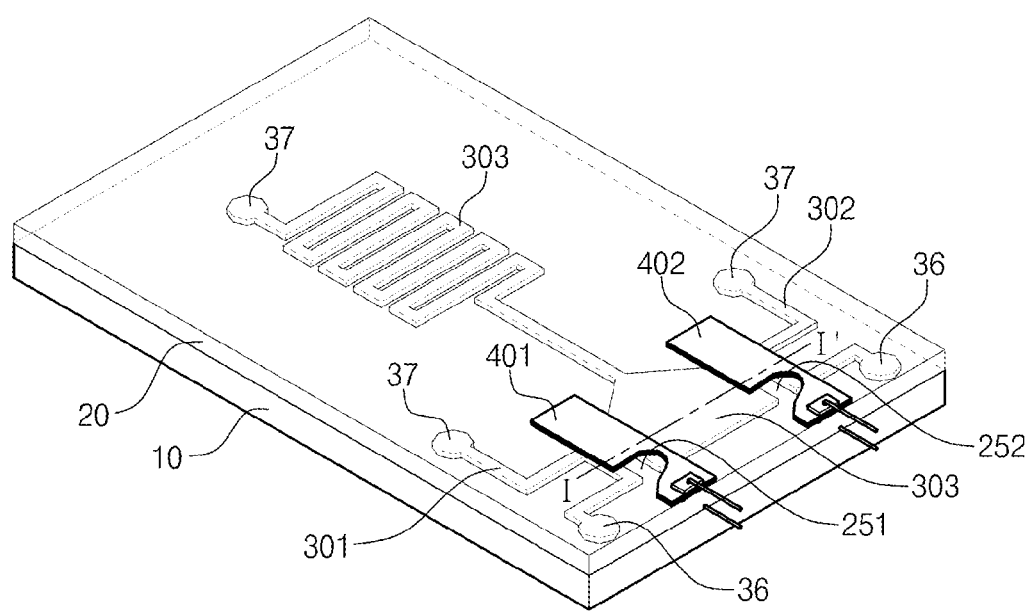
FIGS. 3 and 4 are perspective and cross-sectional views exemplarily illustrating a lab-on-a-chip according to an embodiment of the present invention.
Figure 4:
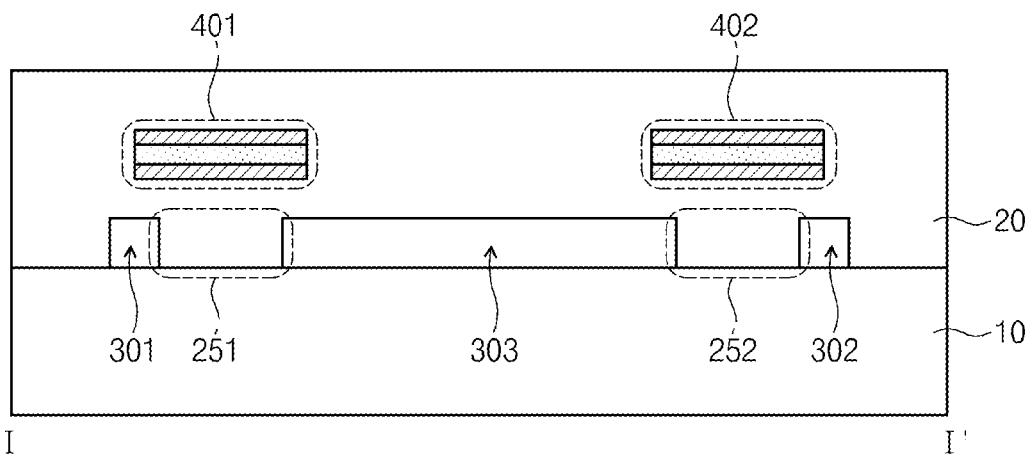

FIGS. 3 and 4 are perspective and cross-sectional views exemplarily illustrating a lab-on-a-chip according to an embodiment of the present invention. FIG. 4 is a cross-sectional view taken along the dotted line I-I' of FIG. 3. For the simplicity of the description, the description relating to the technical characteristics overlapping with the embodiments described with reference to FIGS. 1 and 2 will not be provided.

Referring to FIG. 3, a flexible structure 20, which defines a first channel 301 and a second channel 302 spaced apart from each other, may be formed on a substrate 10. In addition, the flexible structure 20 may be formed to define a third channel 303 between the first and second channels 301 and 302. The third channel 303 is spaced apart from the first and second channels 301 and 302. The first and second channels 301 and 302 may have an inlet 36 where a fluid is supplied from the outside, respectively. Further, the first to third channels 301, 302 and 303 may further have an outlet 37 where the supplied fluid is discharged, respectively.

The flexible structure 20, as illustrated in FIG. 4, may have a first valve portion 251 formed between the first and third channels 301 and 303, and a second valve portion 252 formed between the second and third channels 302 and 303. Also, first and second polymer actuators 401 and 402 disposed over the first and second valve portions 251 and 252 may be inserted in the flexible structure 20. The valve portion 25 and the polymer actuator 40 according to the embodiment described with reference to FIG. 1 may be used to embody the first valve portion 251 and the first polymer actuator 401 and the second valve portion 252 and the second polymer actuator 402.

A fluid including biomolecules is supplied to at least one of the first and second channels 301 and 302, and a reactant reacting with the biomolecules may be supplied to the other. Therefore, when the first and second valve portions 251 and 252 are spaced apart from the substrate 10 by actuating of the first and second polymer actuators 401 and 402, the biomolecules and the reactant may react after flowing in through the third channel 303. According to embodiments of the present invention, the fluid including the biomolecules may be blood. However, it is not limited thereto, and the types of the biomolecules are also not limited.

FIGS. 5 through 8 are perspective views exemplarily illustrating micro-valve structures and operating methods thereof according to modified embodiments of the present invention. For the simplicity of the description, the description relating to the technical characteristics overlapping with the embodiments described with reference to FIGS. 1 through 4 will not be provided.

Referring to FIGS. 5 through 8, a recessed region 15 having an upper surface lower than the periphery may be formed in a predetermined region of the substrate 10. The recessed region 15 may be formed in various shapes. For example, a width of the recessed region 15 may be tapered upward as illustrated in FIG. 5, or be substantially equal as illustrated in FIG. 6, or be tapered downward as illustrated in FIG. 7.

The flexible structure 20 may have a valve portion 25 inserted into the recessed region 15, and a polymer actuator 40 adjacent to the valve portion 25 may be inserted into the flexible structure 20. The valve portion 25 may be formed to have an engaged shape to the recessed region 15. For example, as illustrated in FIG. 5, when the recessed region 15 has an upward tapered shape, the valve portion 25 may also have an upward tapered shape. As illustrated in FIG. 6, the recessed region 15 and the valve portion 25 may be formed to have a rectangular parallelepiped shape, or as illustrated in FIG. 7, the recessed region 15 and the valve portion 25 may have a downward tapered shape.

As illustrated in FIGS. 5 through 7, the micro-valve structures according to the embodiments may have a normally open structure. That is, when a voltage is not applied, a channel defined by the substrate 10 and the flexible structure 20 may be in an open state. For this purpose, when the voltage is not applied, the recessed region 15 and the valve portion 25 are spaced apart from each other such that the channel may be in the open state. In addition, the width of the valve portion 25 may be narrower than the width of the recessed region 15.

Figure 8:
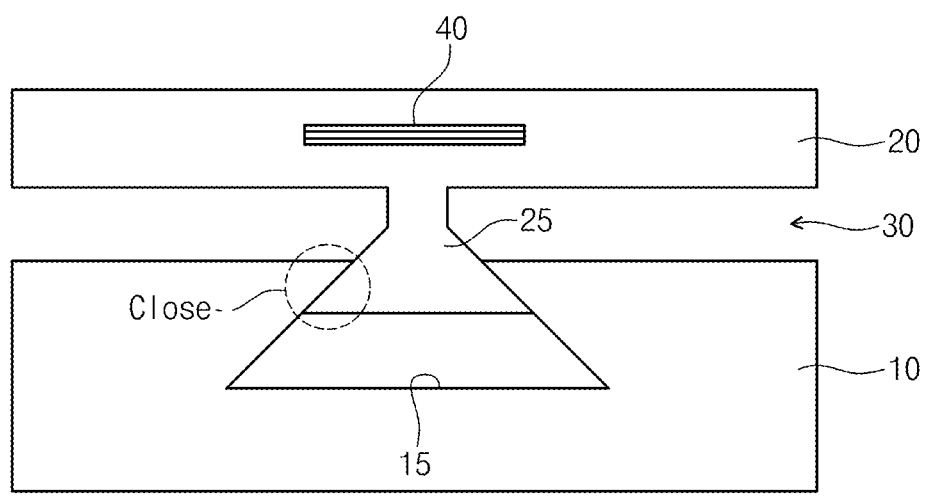

Meanwhile, when the voltage is applied to both electrodes of the polymer actuator 40, the polymer actuator 40 may lift the valve portion 25 upward by convexly bending upward. In this case, as illustrated in FIG. 8, the valve portion 25 is in contact with sidewalls of the recessed region 15 such that the channel may be closed. According to other embodiments, when the voltage is applied, the polymer actuator 40 convexly bends downward such that the valve portion 25 may touch a bottom of the recessed region 15. In this case, the channels according to the embodiments illustrated in FIGS. 6 and 7 may be closed.

In order for the micro-valve structure to have the normally open structure, a spacer (not shown) determining a thickness of the channel 30 may be further disposed between the flexible structure 20 and the substrate 10. According to some embodiments, the spacer may be provided as a portion of the flexible structure 20 or the substrate 10.

Figure 9:
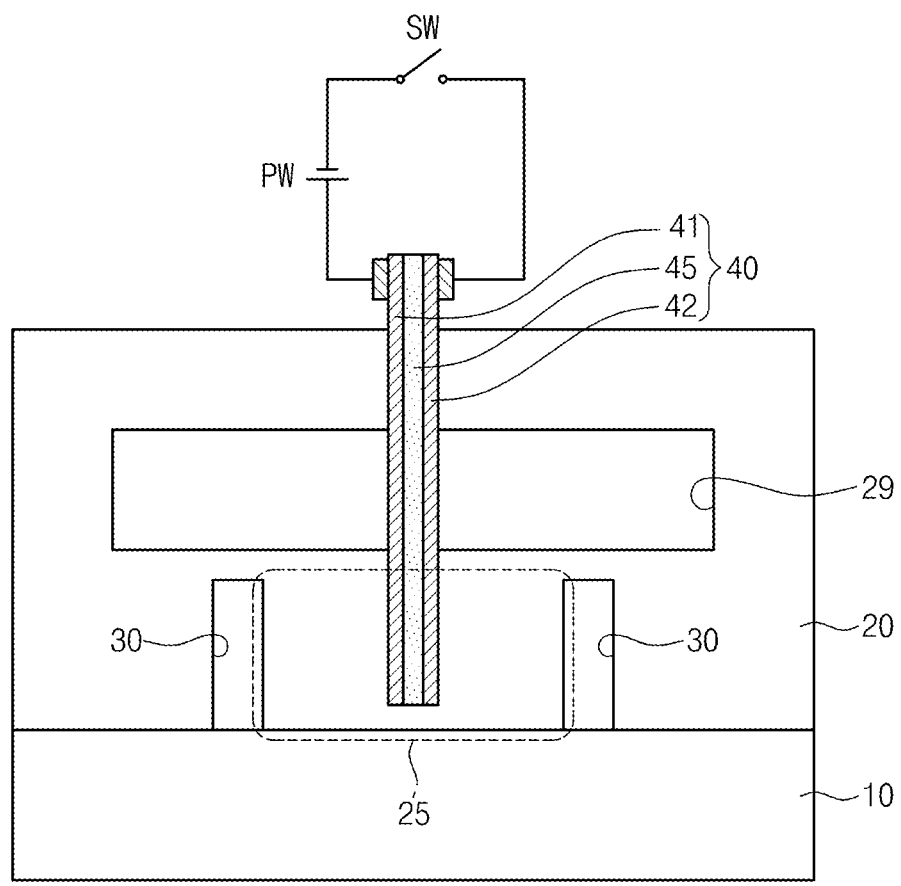
FIGS. 9 and 10 are cross-sectional and perspective views exemplarily illustrating a micro-valve structure and an operating method thereof according to another embodiment of the present invention.
Figure 10:
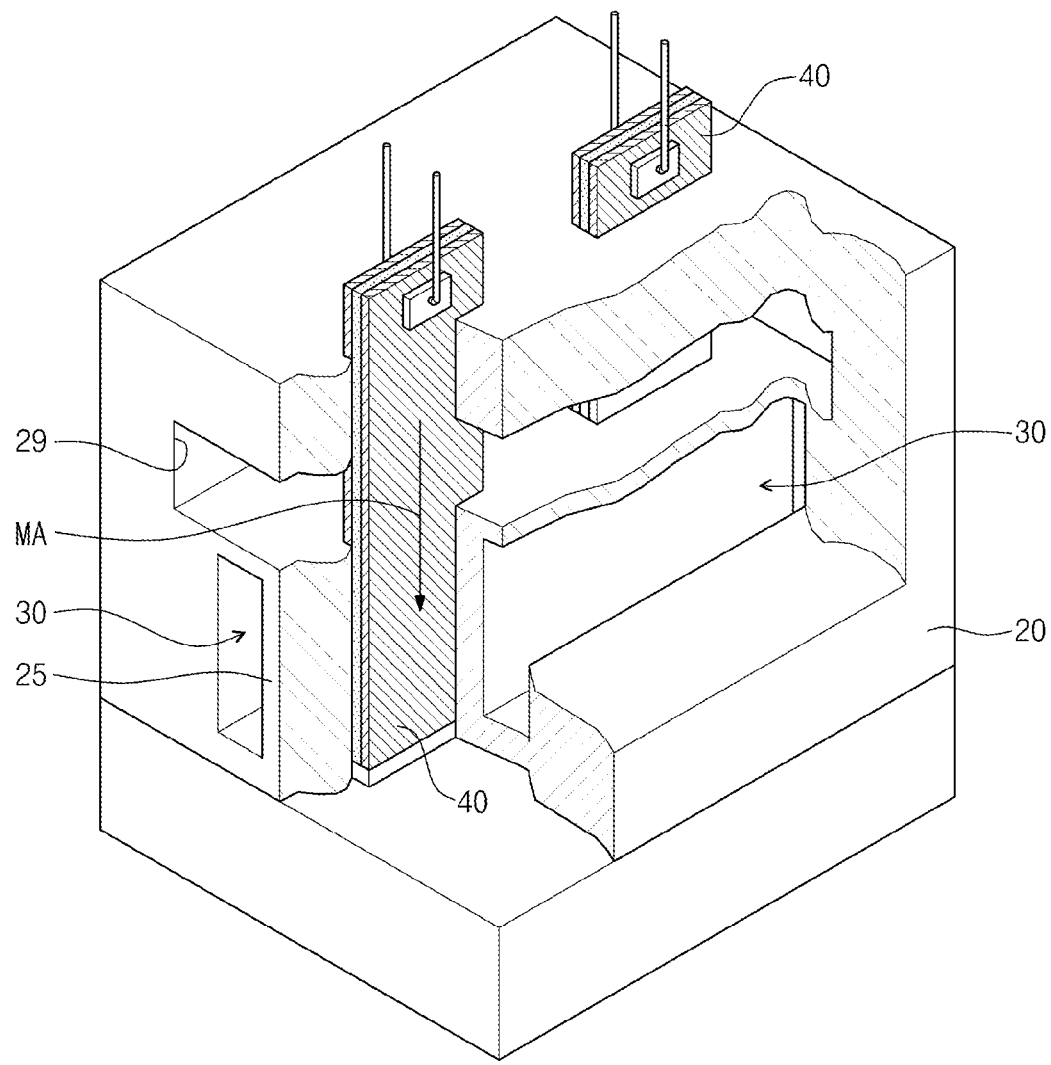
Figure 11:
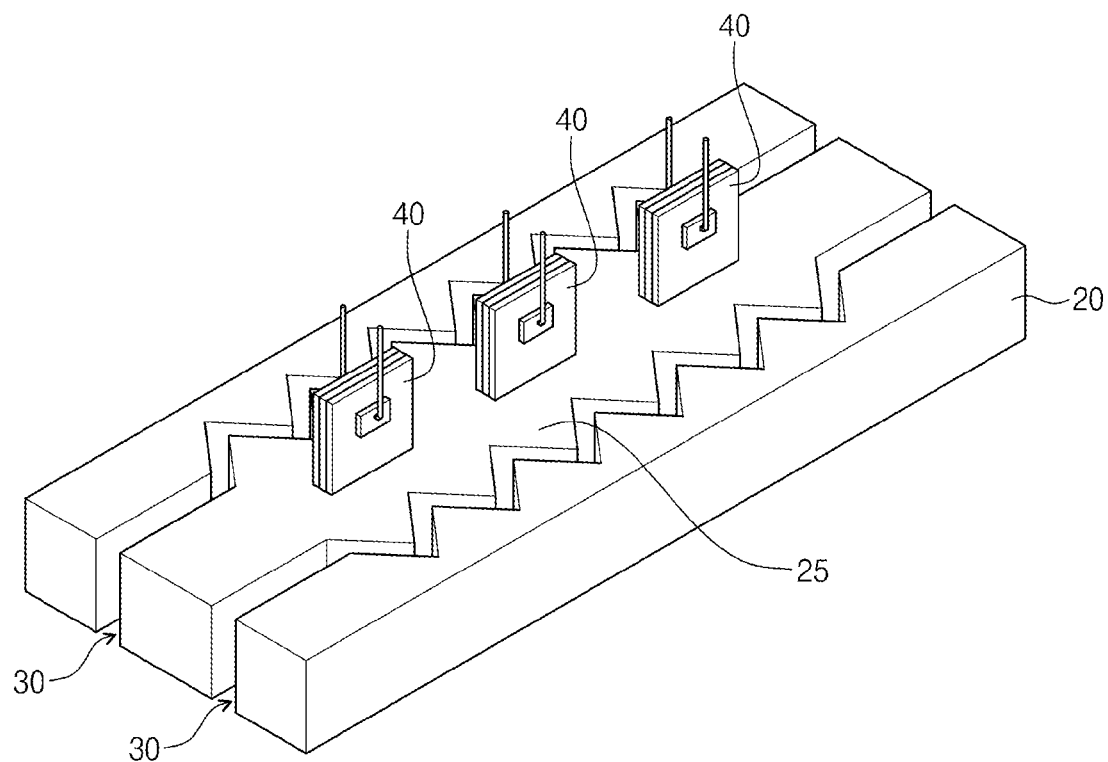
FIGS. 11 and 12 are perspective views exemplarily illustrating micro-valve structures and operating methods thereof according to other modified embodiments of the present invention.
Figure 12:
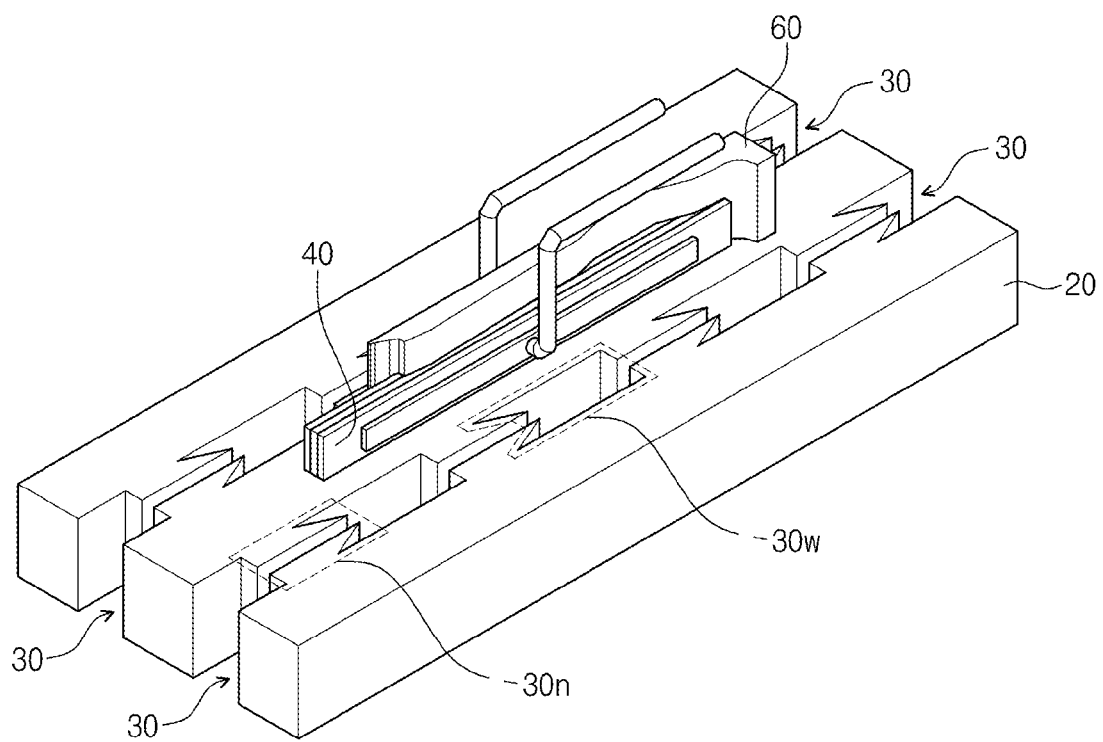

FIGS. 9 and 10 are cross-sectional and perspective views exemplarily illustrating a micro-valve structure and an operating method thereof according to another embodiment of the present invention, and FIGS. 11 and 12 are perspective views exemplarily illustrating micro-valve structures and operating methods thereof according to other modified embodiments of the present invention. For the simplicity of the description, the description relating to the technical characteristics overlapping with the embodiments described with reference to FIGS. 1 through 8 will not be provided.

Referring to FIGS. 9 and 10, a flexible structure 20 defining channels 30 spaced apart from each other is disposed on a substrate 10. The flexible structure 20 may have a valve portion 25 disposed between the channels 30, and at least one polymer actuator 40 inserted into the valve portion 25 is disposed in the flexible structure 20.

According to some embodiments, the polymer actuator 40 may be disposed, in which a major axis MA thereof is substantially positioned perpendicular to an upper surface of the substrate 10. For example, as illustrated in FIG. 10, the polymer actuator 40 may be a thin rectangular parallelepiped having rectangular shaped upper and lower surfaces, and the surfaces (e.g., the upper and lower surfaces) having the widest area in the polymer actuator 40 may be perpendicular to the upper surface of the substrate 10. Therefore, a displacement of the polymer actuator 40 may occur along a direction crossing the channels 30, and a transverse displacement of the polymer actuator 40 causes a transverse displacement of the valve portion 25 that changes the widths of the channels 30.

According to some embodiments, the flexible structure 20 may include a gap region 29 disposed at an upper portion of the channel 30. The gap region 29 may be filled with a gas at atmospheric pressure. The polymer actuator 40 may be inserted into the valve portion 25 of the flexible structure 20 by penetrating into the gap region 29. Since a reaction or a resistance against the actuating force of the polymer actuator 40 is decreased by the gap region 29, the actuating force of the polymer actuator 40 may be better transferred to the valve portion 25. According to the foregoing configuration, the voltage applied to the polymer actuator 40 may be reduced.

Although bottom surfaces of the channels 30 may be defined by the upper surface of the substrate 10 as illustrated in FIG. 9, the bottom surfaces may be defined by the flexible structure 20 as illustrated in FIG. 10. That is, according to the embodiment of FIG. 10, the channels 30 may be formed inside the flexible structure 20 by being spaced apart from the upper surface of the substrate 10.

As illustrated in FIGS. 10 and 11, a plurality of polymer actuators 40 may be inserted into the flexible structure 20. At this time, some of the polymer actuators 40 are formed to generate the actuating force toward the one channel 30, and the others may be formed to generate the actuating force toward the other channel 30. For example, when the channels 30 are parallel to the xy-plane and major axes thereof are substantially in the y-direction, some polymer actuators 40 generate a displacement in the x-direction, and the other polymer actuators 40 may generate a displacement in the −x-direction. In this case, it is possible to close all the channels 30 as well as selectively closing of the one channel 30.

Shapes of the channels 30 may be variously changed as illustrated in FIGS. 11 and 12. For example, the channels 30 may be formed in a zigzag shape as illustrated in FIG. 11, or may be formed to have at least one narrow region 30n and at least one wide region 30w disposed alternatingly as illustrated in FIG. 12. In addition, as illustrated in FIG. 12, the channel 30 may be formed, in which a boundary region between the narrow region 30n and the wide region 30w has a tapered shape like cardiac valves.

Figure 13:
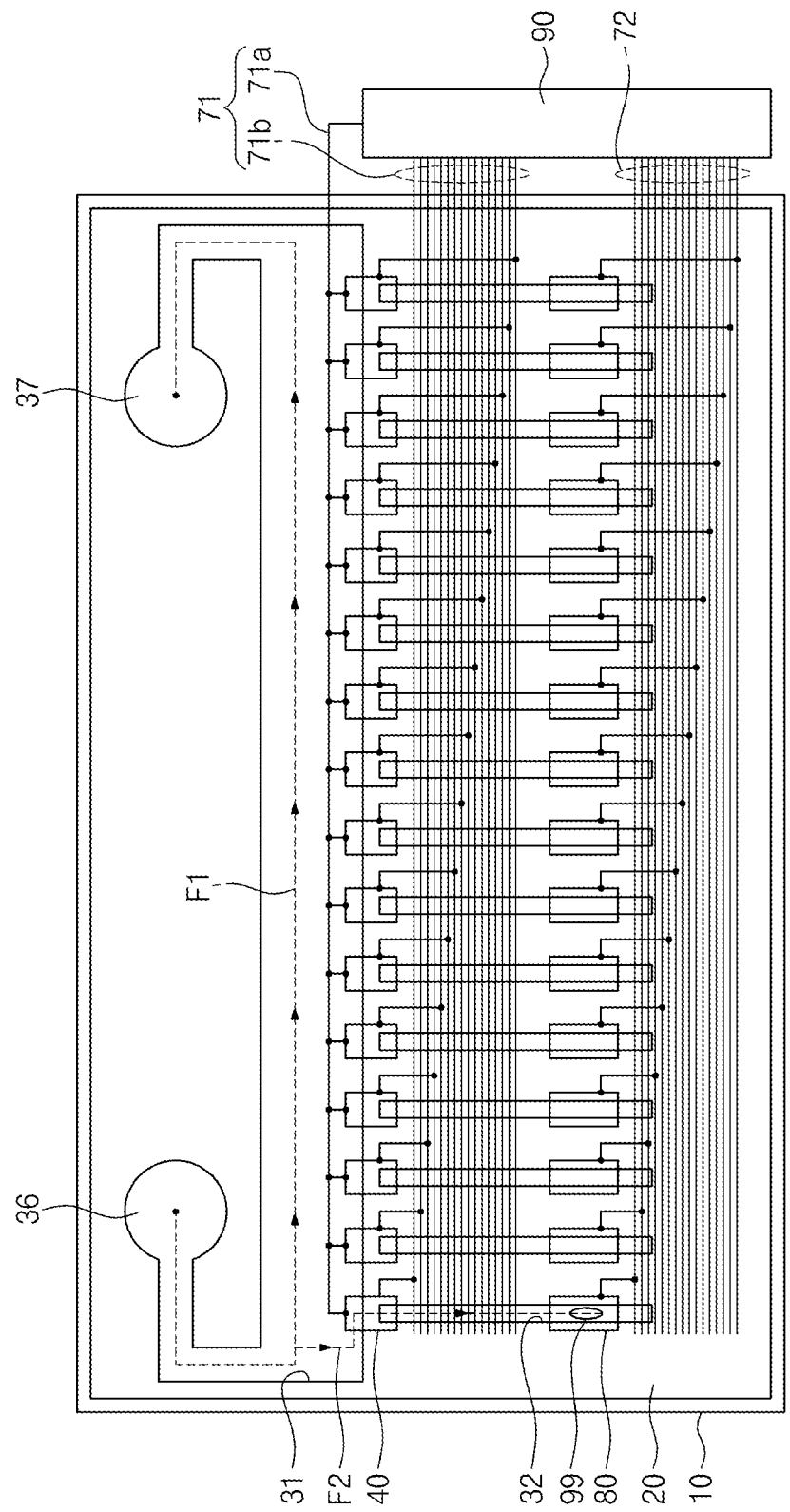
FIGS. 13 and 14 are cross-sectional views exemplarily illustrating lab-on-a-chips according to other embodiments of the present invention.
Figure 14:
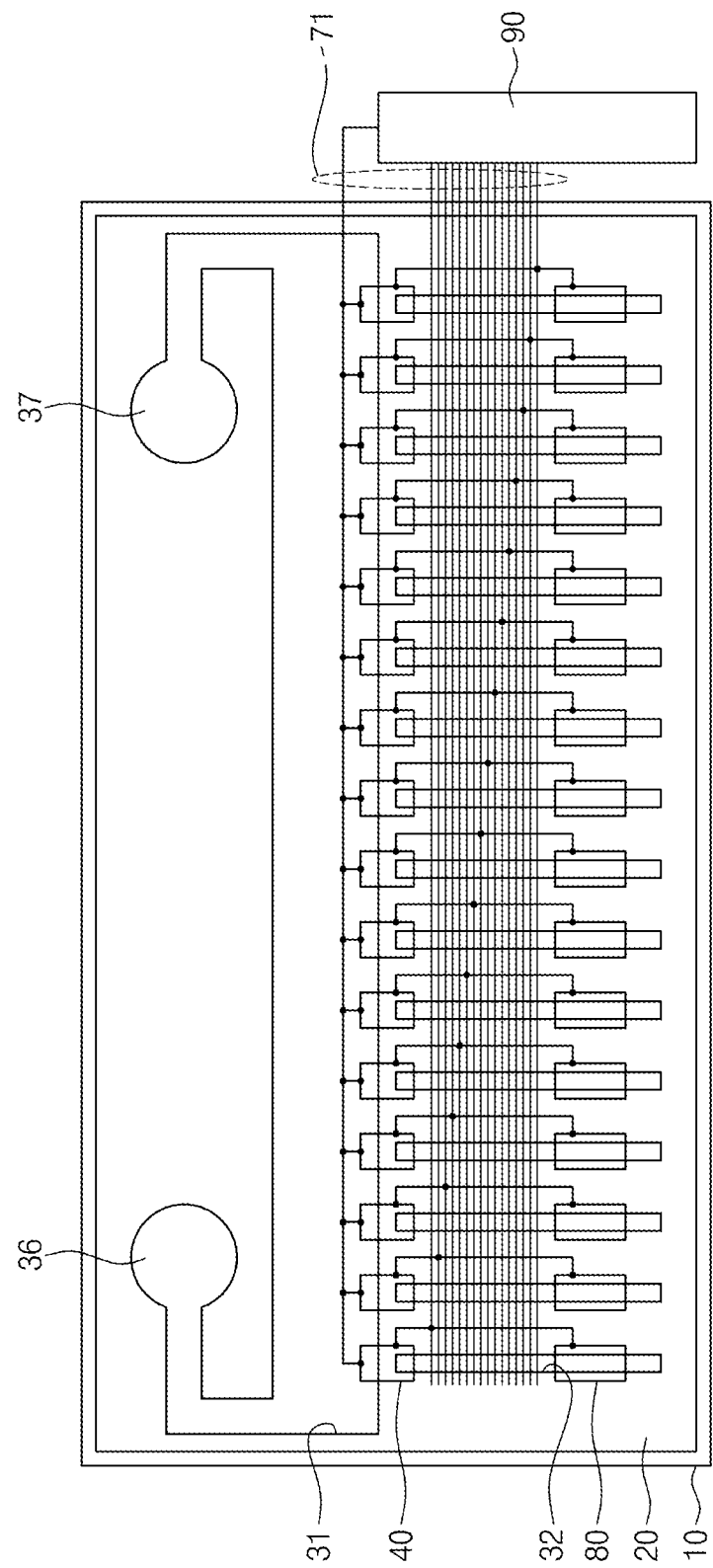
Figure 15:
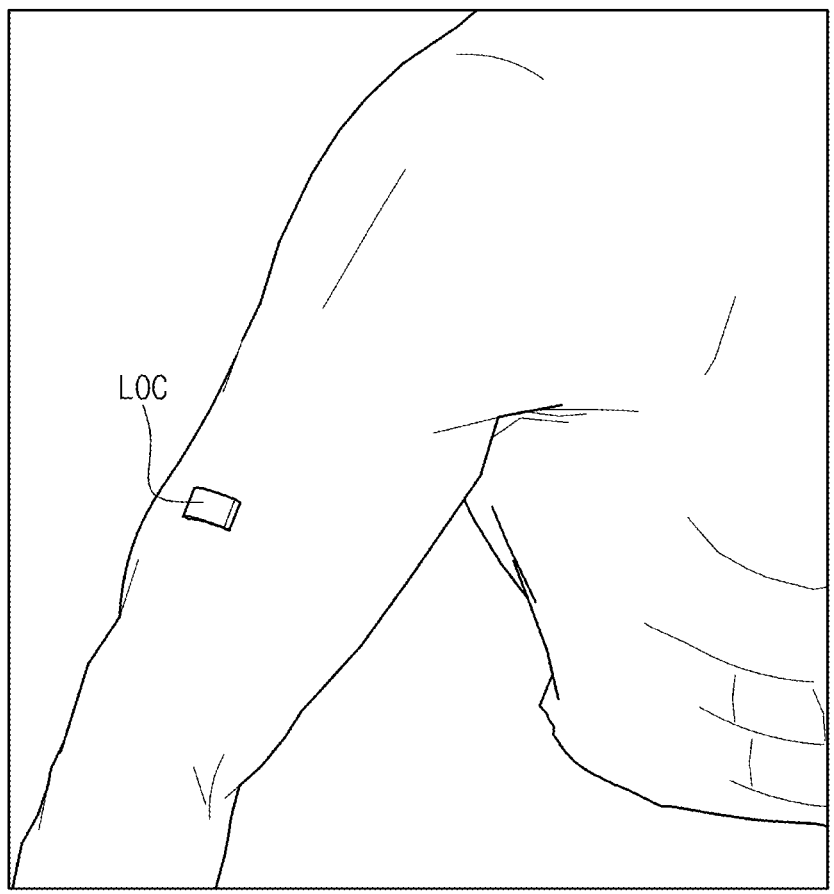
FIG. 15 is a drawing exemplarily illustrating use of a lab-on-a-chip according to the present invention.

FIGS. 13 and 14 are cross-sectional views exemplarily illustrating lab-on-a-chips according to other embodiments of the present invention. FIG. 15 is a drawing exemplarily illustrating use of a lab-on-a-chip according to the present invention. For the simplicity of the description, the description relating to the technical characteristics overlapping with the embodiments described with reference to FIGS. 1 through 12 will not be provided.

Referring to FIGS. 13 and 14, a lab-on-a-chip may include a flexible structure 20 disposed on a substrate 10 to define channels 31 and 32. The channels 31 and 32 may include a first channel 31 connecting an inlet 36 and an outlet 37, and a plurality of second channels 32 spaced apart from the first channel 31.

The flexible structure 20 may include a valve portion separating the second channels 32 from the first channel 31. Also, a plurality of polymer actuators 40 may be inserted into the flexible structure 20, and the polymer actuators 40 may be disposed adjacent to the valve portions, respectively. According to some embodiments, the shape and arrangement of the valve portion and the polymer actuator 40 may be the same as the embodiment described with reference to FIG. 1. However, according to other embodiments, the shape and arrangement of the valve portion and the polymer actuator 40 may be the same as the embodiments described with reference to FIGS. 5 through 12 or may be a modification thereof.

In addition, the lab-on-a-chip may further include a controller 90 actuating the polymer actuators 40 and a control interconnection structure 71 electrically connecting the polymer actuators 40. According to some embodiments, the controller 90 may be provided as an internal component of the lab-on-a-chip. For example, the controller 90 may be attached to one surface of the substrate 10. However, according to the other embodiments, the controller 90 may be provided as an external component of the lab-on-a-chip. For example, the control interconnection structure 71 is composed of flexible interconnections such that the relative position and distance between the controller 90 and the substrate 10 may be changed.

The control interconnection structure 71 may include a first control interconnection 71a commonly connected to the polymer actuators 40 and second control interconnections 71b connected to the polymer actuators 40, respectively. As described with reference to FIG. 1, the polymer actuator 40 may include a first electrode 41, a second electrode 42 and the electroactive polymer 45 disposed therebetwen. In this case, the first control interconnection 71a is connected to the first electrode 41 of the polymer actuators 40, and the second control interconnections 71b may be connected to the second electrodes 42 of the polymer actuators 40, respectively. That is, the number of the second control interconnections 71b may be the same as the number of the polymer actuators 40.

The first channel 31 may be formed, in which a fluid including biomolecules passes therethrough. For example, the fluid may be blood, and the first channel 31 may be provided as a bypass of a blood vessel. More particularly, the lab-on-a-chip (LOC) according to the present invention may be attached to a human body (e.g., forearm) as illustrated in FIG. 15, and an inlet 36 and an outlet 37 of the first channel 31 may be connected to one blood vessel of the human body.

A reactant reacting with the biomolecules may be formed in the second channels 32. In this case, when the fluid including the biomolecules is flowed into the second channel 32 through the actuation of the polymer actuators 40, a reaction product 99 between the biomolecules and the reactant may be formed in the second channel 32.

The lab-on-a-chip may further include reaction detectors 80 monitoring whether the reaction product 99 is generated. For example, as illustrated in FIGS. 13 and 14, the reaction detectors 80 may be disposed on upper portions of the second channels 32, respectively. Although the technical spirit of the present invention is not limited to a method detecting the reaction product 99, according to some embodiments, the reaction detector 80 may be formed to measure the presence of the reaction product 99 by using an optical or electrical method. An action control of the reaction detector 80 or a transmission of the measured data, as illustrated in FIG. 13, may be achieved through a detection interconnection structure 72 connecting the reaction detectors 80 and the controller 90. However, according to the other embodiments, the control interconnection structure 71 may function as a detection interconnection structure connecting the reaction detectors 80 and the controller 90 as illustrated in FIG. 14.

When the second control interconnections 71b different from each other are connected to the polymer actuators 40, the polymer actuators 40 may be actuated independently. For example, the polymer actuators 40 may be sequentially actuated by responding to a control signal from the controller 90. In this case, the second channels 32 may be sequentially connected to the first channel 31, and a fluid F1 in the first channel 31 may be flowed into the opened second channel 32 through an influx F2 of the fluid F1. That is, the controller 90 may be formed to actuate the polymer actuators 40 at different times from each other with a predetermined time interval. Since the sequential actuation makes possible to periodically monitor a biochemical status of the life, critical issues such as a heart attack or a stroke may be prevented. According to the embodiments, the same reactants may be formed in the second channels 32.

However, according to the modified embodiments, the reactants formed in the second channels 32 may be two types. In this case, two risk factors or diseases may be monitored through the lab-on-a-chip.

According to embodiments of the present invention, a polymer actuator, which generates a mechanical displacement corresponding to an applied voltage, is used for a micro-valve structure or a lab-on-a-chip. As a result, the micro-valve structure or the lab-on-a-chip may be miniaturized as well as possibly achieving low power consumption characteristics when compared with a method using a piezoelectric device. Therefore, the lab-on-a-chip according to the present invention can be manufactured as a product such as a point-of-care testing (POCT) device or a portable device.

In addition, according to some embodiments of the present invention, the polymer actuator is spaced apart from a microchannel by means of a flexible structure. That is, the polymer actuator is not directly in contact with a fluid in the microchannel. Therefore, technical difficulties arising from the direct contact between the polymer actuator and the fluid can be prevented. That is, the micro-valve structure or the lab-on-a-chip according to the present invention can have improved durability and reliability.

According to some embodiments of the present invention, a valve portion, which controls the opening and closing operation of the micro-valve (e.g., a width control of the channel), is mechanically and directly connected to the polymer actuator. Therefore, an actuating force of the polymer actuator for the opening and closing operation may be directly transferred to the valve portion. The micro-valve structure or the lab-on-a-chip according to the present invention can achieve an increased operating speed by the direct transfer of the actuating force.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A micro-valve structure comprising:
    a substrate;
    a flexible structure disposed on the substrate; and
    a polymer actuator with a three-layer laminate structure comprising an ionic polymer metal composite layer disposed between first and second electrode layers inserted into the flexible structure,
    wherein the flexible structure has a valve portion defining a microchannel and the polymer actuator is separated from the microchannel by the flexible structure,
    wherein the polymer actuator is formed to change a width of the microchannel by mechanically and directly controlling a displacement of the valve portion, and
    wherein the first electrode layer is disposed between the second electrode layer and the valve portion.

2. The micro-valve structure of claim 1, wherein the ionic polymer metal composite comprises a sulfonated tetrafluoroethylene based fluoropolymer-copolymer.

3. The micro-valve structure of claim 1, wherein the microchannel comprises first and second channels spaced apart from each other and the valve portion of the flexible structure is disposed between the first and second channels,
    wherein the polymer actuator has a portion inserted into the valve portion.

4. The micro-valve structure of claim 3, wherein the polymer actuator has a width greater than a sum of widths of the first and second channels and the valve portion.

5. The micro-valve structure of claim 3, wherein the polymer actuator has a parallelepiped shape having rectangular upper and lower surfaces.

6. The micro-valve structure of claim 1, wherein the microchannel has an inlet where a fluid is supplied from outside and has an outlet where the fluid is discharged.

7. The micro-valve structure of claim 1, wherein the substrate has a recessed region used as the microchannel and the valve portion of the flexible structure is inserted into the recessed region.

8. The micro-valve structure of claim 1, wherein a widest surface of the polymer actuator is disposed substantially parallel to an upper surface of the substrate.

9. The micro-valve structure of claim 1, wherein the widest surface of the polymer actuator is disposed substantially perpendicular to the upper surface of the substrate.

10. A micro-valve structure comprising:
    a substrate;
    a flexible structure including a valve portion between first and second channels spaced apart from each other and disposed on the substrate; and
    a polymer actuator with a three-layer laminate structure comprising an ionic polymer metal composite layer disposed between first and second electrode layers inserted into the flexible structure to control a displacement of the valve portion,
    wherein the first electrode layer is disposed between the second electrode layer and the valve portion.

11. The micro-valve structure of claim 10, wherein the polymer actuator is spaced apart from the first and second channels by the flexible structure.

12. The micro-valve structure of claim 10, wherein the polymer actuator is surrounded by the flexible structure such that the electrodes of the polymer actuator are not exposed to an external atmosphere or the first and second channels.

13. The micro-valve structure of claim 10, wherein the ionic polymer metal composite comprises a sulfonated tetrafluoroethylene based fluoropolymer-copolymer.

14. A lab-on-a-chip module comprising:
    a substrate;
    a flexible structure including a first channel, a plurality of second channels, and a plurality of valve portions spatially separating the second channels from the first channel;
    a plurality of polymer actuators inserted into the flexible structure to control displacements of the valve portions, respectively; and
    a controller independently controlling each of the polymer actuators,
    wherein each of the polymer actuators has a three-layer laminate structure comprising an ionic polymer metal composite layer disposed between first and second electrode layers, and wherein each of the first electrode layers is disposed between each of the second electrode layers and each of the valve portions.

15. The lab-on-a-chip module of claim 14, wherein the controller is formed to actuate at least two of the polymer actuators at different times from each other with a predetermined time interval.

16. The lab-on-a-chip module of claim 14, wherein the first channel is configured to pass a fluid including biomolecules, and reactants configured to react with the biomolecules are disposed in each of the second channels.

17. The lab-on-a-chip module of claim 16, wherein the reactants formed in each of the second channels are the same and only one of the polymer actuators is actuated at a time.

18. The lab-on-a-chip module of claim 14, further comprising at least one reaction detector coupled to one of the second channels to monitor a reaction between the fluid and the reactant.

* * * * *